Patented Feb. 22, 1927.

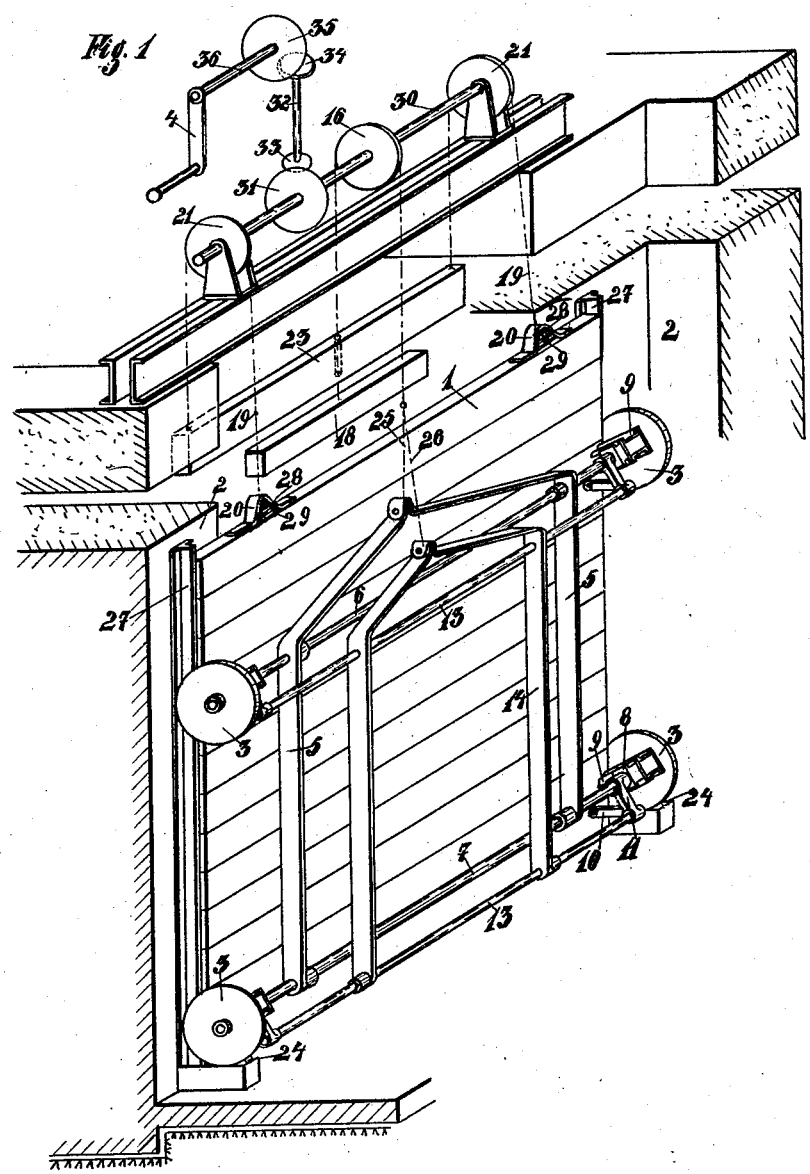

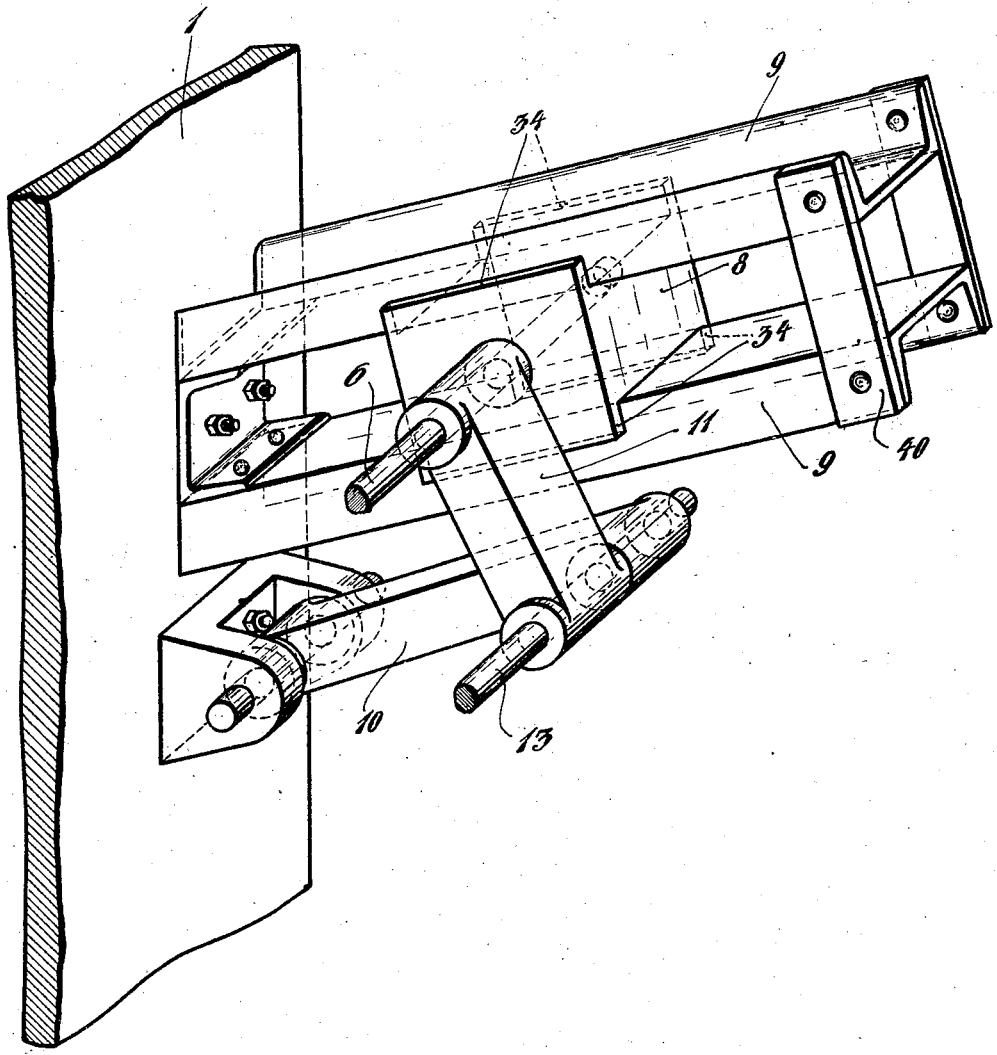

1,618,545

UNITED STATES PATENT OFFICE.

VICTOR MANN, OF CASSEL, GERMANY.

ROLLER SLUICE.

Application filed September 11, 1922. Serial No. 587,407.

Roller sluices are known in which at the beginning of the lifting movement the sluice is loosened at the jointing surface of the masonry in order to reduce the considerable first resistance from friction which is caused by rusting after long interruptions of service.

This loosening of the sluice board is effected, according to the invention, with the aid of a crank mechanism sliding upon guides.

In order that the invention may be clearly understood, I shall hereinafter proceed to describe the same with reference to the form of construction shown by way of example on the accompanying drawing, wherein:—

Fig. 1 is a perspective view of the roller sluice.

Fig. 2 shows on enlarged scale the link mechanism and the slidable bearing.

The principal parts of the roller sluice are the sluice board 1 which is in contact with the jointing surfaces 2 of the masonry, the pulleys 3 and the winch mechanism 4. The four pulleys 3 are united by an iron frame of flat irons 5 and by the two axles 6 and 7 to form a rolling carriage which is not rigidly connected with the sluice board 1, but movable with regard to the same in slidable bearings 8, adapted to slide on guide rails 9. One of the slidable bearings 8 for the pulleys 3 is shown in Fig. 2 on enlarged scale so that it can be clearly seen from this figure how the slidable bearing 8 is inserted into its guide rail 9. The movement of the slidable bearing is limited by the bars 40 which are placed outside the U-irons 9 after the slidable bearing 8 has been inserted. Fig. 2 shows clearly the upper and lower sliding surfaces and the flanges 34 designed to prevent the slidable bearing from jumping out of the guide rails. The sluice board is connected with the rolling carriage at each of its four corners by means of a link 10 hingedly mounted at one end on the sluice board 1 and at the other end on the corresponding axle 13 and further by means of a link 11 hingedly mounted at one end to the same axle 13 and at the other end on the corresponding axle 6 or 7 which connect each one pair of pulleys 3 and the corresponding slidable bearings 8. The two axles 13 are rigidly connected with one another by an inverted U-shaped frame of flat irons 14. A pull chain 25 attached to the rolling carriage 5 for the sluice board 1 is guided over a grooved pulley 16 mounted on the axle 30 fixed on the top of the sluice wall. A short cable 26 attached at the lower end to the rigid frame 14 is attached with its upper end to the pull chain 25. On the free end of the pull chain 25 a counterweight 18 is suspended. Two chains 19 attached to the two suspension points 20 of the sluice board 1 are guided over sprocket wheels 21 and have a common counterweight 23 at the free ends. On the shaft 30 which carries the pulley 16 and the sprocket wheels 21 a bevel wheel 31 is keyed which, through the intermediary of a vertical shaft 32 carrying bevel wheels 33, 34 is connected with a bevel wheel 35 on the shaft 36 of the winch 4.

If the sluice board 1 is lowered with the aid of winch 4 the lower pulleys 3 come to rest upon the lower rails 24 and therefore the axles 6 and 7 and also the bearings 8 rest in their height but the sluice board 1 can continue a trifle to descend as the guide rails 9 are inclined from their exterior ends to the sluice board. This inclination regulates also the direction of the movement of the sluice board towards the jointing surfaces 2 of the masonry with strong pressure as the guide rails 9 slide on the bearings 8 and further owing to the pressure exerted by the water. The chain 15 to which the carriage is suspended becomes thus slack but the cable 26 to which the frame 14 of the crank mechanism is suspended remains taut as the links 10 and 11 must participate in the downward movement of the sluice board 1.

Inversely, if the sluice is to be opened, only the chain 26 will be stretched. As this chain 26 through the rigid frame of flat irons 14 transmits its movement upon the axles 13 and upon the links 11, 10 and as the links 11 act on the axles 7, 6 of the pulleys 3 these pulleys are pressed against the rails 27 which are fixed on the masonry 2, whereby the sluice board is lifted off the jointing surfaces. At this occasion the U-irons 9 slide again on the slidable bearings 8 whereby the axles 13 are raised so that the pull chain 25 is stretched also and the rolling frame 5 is slightly raised. When the pull chain 25 is wound up the frame 5 with the sluice board is raised. The sliding back of the U-irons 9 on the slidable bearings 8 is prevented by the stretched cable 26.

Compensating springs 28 adapted to be adjusted by means of screws 29, serve for compensating the unequal lengths of the chains 15 and 19 during the time the sluice board 1 and its U-irons 9 execute a relative movement with regard to the slidable bearings 8 and the rolling frame 5. This is necessary if—as is supposed to be the case—the sprocket wheels 21 are keyed on the same axle 30 as the grooved pulley 16. As soon as the sluice board 1 hangs vertically it is raised by means of winch 4 without any sliding friction, only the pulleys 3 exerting a rolling friction on the rails 27.

I claim:—

1. An improved roller sluice comprising in combination with the sluice gate, a winch on the top end of said sluice gate, a sluice board movable on said sluice gate, pulleys on the sides of said sluice board, an axle connecting said pulleys, a rigid frame on said axle and forming together with said pulleys a rolling carriage, upwardly inclined guide rails one for each pulley rigidly fixed on the front surface of said sluice board, slidable bearings one for each pulley guided on said guide rails and mounted on the axle connecting said pulleys, one link for each pulley hingedly fixed on the front surface of said sluice board, an axle connecting the other ends of said links, links connecting said link axle with said pulley axle, a rigid frame mounted on said link axle, upwardly inclined supporting rails for said pulleys, said rails being fixed on the side walls of the sluice gate, and means for connecting said two frames with said winch so that at the operation of the winch the closed sluice board is first unseated from the jointing surfaces of the masonry by the action of the link mechanism before it is raised, whilst at the lowering of the sluice board said pulleys are stopped by said supports before the sluice board has reached its end position so that the sluice board continuing to descend under the action of its weight is strongly pressed by the effect of said inclined rails against the jointing faces of the masonry.

2. An improved roller sluice comprising in combination with the sluice gate, a winch on the top end of said sluice gate, a sluice board movable on said sluice gate, two pairs of pulleys on the sides of said sluice board one pulley at each corner, an axle connecting the pulleys of the upper pair, an axle connecting the pulleys of the lower pair, a rigid frame on said axles and forming together with said pulleys a rolling carriage, upwardly inclined guide rails one for each pulley rigidly fixed on the front surface of said sluice board, slidable bearings one for each pulley guided on said guide rails and mounted on the axles connecting said pulleys, one link for each pulley hingedly fixed on the front surface of said sluice board, an axle connecting the other ends of the links near the pulleys of the upper pair and an axle connecting the links near the pulleys of the lower pair, links connecting said link axles with said pulley axles, a rigid frame mounted on said link axles, upwardly inclined supporting rails for the pulleys of the lower pair fixed on the bottom of the sluice gate, and means for connecting said two framees with said winch so that at the operation of the winch the closed sluice board is first unseated from the jointing surfaces of the masonry by the action of the link mechanism before it is raised, whilst at the lowering of the sluice board said pulleys are stopped by said supports before the sluice board has reached its end position so that the sluice board continuing to descend under the action of its weight is strongly pressed by the effect of said inclined rails against the jointing faces of the masonry.

3. An improved roller sluice comprising in combination with the sluice gate, a winch on the top end of said sluice gate, a sluice board movable on said sluice gate, two pairs of pulleys on the sides of said sluice board, one pulley at each corner, an axle connecting the pulleys of the upper pair, an axle connecting the pulleys of the lower pair, a rigid frame on said axles and forming together with said pulleys a rolling carriage, upwardly inclined guide rails one for each pulley rigidly fixed on the front surface of said sluice board, slidable bearings one for each pulley guided on said guide rails and mounted on the axles connecting said pulleys, one link for each pulley hingedly fixed on the front surface of said sluice board, an axle connecting the other ends of the links near the pulleys of the upper pair and an axle connecting the links near the pulleys of the lower pair, links connecting said link axles with said pulley axles, a rigid frame mounted on said link axles, upwardly inclined supporting rails for the pulleys of the lower pair fixed on the bottom of the sluice gate, and means for connecting said two frames with said winch, said means consisting of a pull chain attached to the rolling carriage formed by said pulley frame and said pulleys, a horizontal axle mounted on the top of said sluice gate, means for driving said axle from said winch, a grooved pulley keyed on said axle over which said pull chain is guided, a pull chain attached to said frame on the link axles and to said pull chain of the rolling frame, two grooved pulleys keyed on said horizontal axle near the ends of the same, two pull chains guided over said last mentioned grooved pulleys and attached to the upper edge of said sluice board, a counterweight to which the other ends of said sluice board pull chains are attached, and a counterweight to which the other end of said rolling carriage pull chain is attached so that at the operation of the winch the closed sluice board is first unseated from the jointing surfaces of the masonry by the action of the link mechanism before it is raised, whilst at the lowering of the sluice board said pulleys are stopped by said supports before the sluice board has reached its end position so that the sluice board continuing to descend under the action of its weight is strongly pressed by the effect of said inclined rails against the jointing faces of the masonry.

In testimony whereof I affix my signature.

VICTOR MANN.